United States Patent Office 3,004,084
Patented Oct. 10, 1961

3,004,084
PRODUCTION OF CONJUGATED DIOLEFINS
Wilfred John Oldham, Grangemouth, Scotland, assignor to British Hydrocarbon Chemicals Limited, London, England, a British company
No Drawing. Filed June 18, 1958, Ser. No. 742,710
Claims priority, application Great Britain July 10, 1957
3 Claims. (Cl. 260—681)

The present invention relates to the production of conjugated diolefines by the reaction of aldehydes with lower mono-olefines.

The condensation of olefines with aldehydes is sometimes called the Prins reaction. Such condensation reactions are capable of yielding a variety of products such as m-dioxanes, unsaturated alcohols, 1:3-diols or conjugated diolefines depending on the reaction conditions employed. The production of conjugated diolefines by the reaction between mono-olefines and aldehydes has been carried out by means of a two-stage process and by a one-stage vapour phase process. A variety of catalysts has been proposed for the one-stage reaction of which the best has appeared to be activated alumina. However, the yields of diolefine and efficiency of conversion of the starting materials have been low, owing apparently to the tendency of the diolefine to react with the aldehyde, forming higher boiling condensation products, and also because of the decomposition of formaldehyde to give such products as carbon monoxide. As a result the process has not represented an economic proposition on the industrial scale.

It is an object of the present invention to provide an improved process for the production of conjugated diolefines by the condensation of aldehydes and lower mono-olefines in a single stage reaction, in which improved yields and efficiencies are obtained.

According to the present invention, the process for the production of conjugated diolefines comprises reacting a lower mono-olefine with formaldehyde or acetaldehyde at an elevated temperature in the vapour phase in the presence of a synthetic petroleum cracking catalyst, containing from 0 to 10% of an oxide of a metal from group IIA of the periodic table.

The catalysts which may be used in the process of the invention are the synthetic cracking catalysts used in the cracking of petroleum. Typical examples of these are silica/alumina, silica/magnesia, silica/zirconia, silica/boria, and silica/titania catalysts. Where the catalyst comprises an oxide of a group IIA metal, i.e. an oxide of beryllium, magnesium, calcium, strontium, and barium, this should be present in a proportion less than 10% by weight. The preferred catalyst is silica/alumina, suitably containing about 85% by weight of silica, although the proportion of silica to alumina may vary within moderately wide limits. The pore size of the silica may also vary within moderately wide limits but the preferred catalysts have average pore diameters exceeding about 30 A. The catalysts may be prepared in any suitable manner, and may be activated if desired, for instance by heating in air to temperatures above about 500° C. The activity of the catalyst tends to decline with continued use, owing largely to the deposition of carbon on the catalyst surface, and may be restored in the conventional way, for instance by heating the catalyst in air to burn off the carbon. However, the selectivity of the catalyst for the production of diolefines remains at a high level.

The olefines which are suitable for use in the process of the present invention are the lower mono-olefines having up to six carbon atoms, and particularly the tertiary olefines, i.e. olefines of the general formula $R_1R_2C{=}CHR_3$ where $R_1$ and $R_2$ are lower alkyl radicals and $R_3$ is hydrogen or a lower alkyl radical. Olefines which isomerize under the reaction conditions to give tertiary olefines of the type $R_1R_2C{=}CHR_3$ may also be used. It is particularly preferred to use isobutene, 2-methylbutene-2 and 2-methylbutene-1. The molar proportions of olefin is preferably at least equal to that of the aldehyde used, and is suitably between 1 and 20 moles per mole of aldehyde.

The aldehyde which can be used in the process of the present invention are formaldehyde and acetaldehyde. The use of formaldehyde is preferred. The formaldehyde is suitably derived from industrial formalin, which is a solution of 36 to 40% by weight of formaldehyde in water, usually containing some methanol. Compounds giving rise to formaldehyde under the reaction conditions, e.g. trioxane or paraformaldehyde, may also be used.

It has also been discovered that the proportion of aldehyde in the reaction gas mixture is quite critical, and it is preferred to use proportions of aldehyde in the total feed of less than 10 mole percent, and preferably between 2 and 10 mole percent. This may be achieved by the use of an inert diluent, for instance, nitrogen, hydrocarbons, such as the lower paraffins, carbon dioxide or steam.

The reaction may be carried out over a wide range of temperatures, for instance between 150° and 400° C. It is preferred to use temperatures in the range 250° to 350° C. The contact time of the reactants over the catalyst may also vary. In general contact times of up to 5 seconds are suitable, but it is preferred to use contact times of less than 3 seconds. The lower limit for the contact time is determined by technical and economic considerations. The optimum contact time will vary depending on the reaction temperature, and on the age and activity of the catalyst, and it is preferred to use the longer contact times with the lower temperatures in the range set out above, and vice versa. The reaction is suitably carried out at atmospheric or at moderately increased pressure, but higher or sub-atmospheric pressures may be used if desired.

For the process according to the invention the known methods of vapor phase catalysis may be employed. The catalyst may be a stationary or moving bed or a fluidised bed method may be used. The process is suitably carried out in a continuous manner.

The diolefines can be recovered from the gaseous reaction product in any suitable manner, for instance by condensing the product followed by fractional distillation of the resulting liquid mixture. Unreacted olefines and formaldehyde can be recycled to the catalytic reaction.

A variety of conjugated diolefines can be produced by the process of the invention, including isoprene, from isobutene and formaldehyde.

The diolefines made in accordance with this invention are valuable chemical intermediates, for instance in the preparation of synthetic rubbers.

The process of the invention is further illustrated with reference to the following comparative examples.

EXAMPLE 1

A mixture of formaldehyde and steam, made by the vaporization of formalin, and isobutene was passed at atmospheric pressure over a commercial silica/alumina cracking catalyst, containing 86% of silica. The reaction temperature was 250° C. The reaction products were condensed and the isoprene content was determined by gas chromatography.

Two processes were carried out at the same temperature over identical catalysts. The feed rates and results are given in Table 1.

Table 1

| Run | 1 | 2 |
|---|---|---|
| Formaldehyde feed rate (moles/hour) | 0.249 | 0.568 |
| Mole ratio—isobutene/formaldehyde | 2.04:1 | 2.2:1 |
| Formalin feed concentration (wt. percent HCHO) | 36 | 36 |
| Space velocity (moles aldehyde/litre catalyst/hour) | 2.8 | 6.3 |
| Formaldehyde consumed (moles/hour) | .208 | .236 |
| Isoprene formed (moles/hour) | .053 | .051 |
| Isoprene yield on formaldehyde consumed (moles percent) | 24.2 | 21.8 |

EXAMPLE 2

A series of processes was carried out in which isobutene, formaldehyde and steam was passed at atmospheric pressure over a commercial silica/alumina cracking catalyst containing 86% of silica. In two processes the catalyst was heated to 550° C. in air prior to use. The formaldehyde/steam mixture was obtained by vaporizing industrial formalin, diluted with water where required. The reaction products were condensed and the isoprene content determined by gas chromatography.

By way of comparison the process was repeated using activated alumina as the catalyst.

The reaction conditions and results were given in Table 2.

Table 2

| Run No. | 1 | 2 | 3 | 4 | 5 |
|---|---|---|---|---|---|
| Catalyst | Silica/Alumina | Activated Alumina | Silica/Alumina | Activated Alumina | Silica/Alumina |
| Catalyst heat treatment, °C | 550 | | 550 | | |
| Reaction temperature, °C | 300 | 300 | 300 | 343 | 343 |
| Formaldehyde feed rate, moles HCHO/litre catalyst/hr | 3.2 | 12.3 | 11.1 | 1.3 | 1.3 |
| Formalin feed concentration, wt. percent HCHO | 18.1 | 17.9 | 17.9 | 36.0 | 36.1 |
| Proportion of formaldehyde in total feed (mole percent) | 8.1 | 8.0 | 7.25 | 12.6 | 12.6 |
| Isobutene feed rate, moles/litre catalyst/hour | 12.5 | 47 | 58 | 5.1 | 5.0 |
| Isoprene formed, moles/litre catalyst/hour | 0.96 | 0.49 | 2.44 | 0.068 | 0.204 |
| Yield of isoprene, moles percent based on HCHO consumed | 32.2 | 4.1 | 59.4 | 5.4 | 16.2 |

EVAMPLE 3

A mixture of isobutene, formaldehyde and steam was passed at atmospheric pressure over unactivated silica/alumina catalyst (90 cc.) containing about 86% by weight of silica, at 250° C. The formaldehyde/steam mixture was obtained by vaporizing industrial formalin which had been diluted with water to a concentration of formaldehyde of 18 weight percent. The reaction products were condensed and the isoprene content determined by gas chromatography.

A series of processes were carried out as described above, using different feed rates, different molar proportions of formaldehyde in the feed, and different molar ratios of isobutene:formaldehyde. The reaction conditions and results are set out in Table 3.

Table 3

| Run No. | 1 | 2 | 3 | 4 |
|---|---|---|---|---|
| Proportion of formaldehyde in total feed (moles percent) | 9.57 | 8.98 | 9.39 | 8.45 |
| Formaldehyde feed (moles/hr.) | .259 | .263 | .514 | .522 |
| Mole ratio, isobutene:formaldehyde | 2.1:1 | 2.8:1 | 2.3:1 | 3.5:1 |
| Formaldehyde consumed (moles/hr.) | .123 | .115 | .148 | .138 |
| Isoprene formed (moles/hr.) | .0413 | .049 | .0512 | .0498 |
| Isoprene yield on formaldehyde consumed (moles percent) | 33.6 | 42.5 | 34.6 | 36.1 |

By way of comparison when two similar processes were carried out over the same catalyst (90 cc.) at 250° C., using industrial formalin containing 36.6% by weight of formaldehyde, the yield of isoprene on formaldehyde consumed, i.e. the efficiency, was reduced. In these processes the molar proportion of formaldehyde in the feed was in excess of 10 moles percent. The reaction conditions and results are shown in Table 4.

Table 4

| Run No. | 5 | 6 |
|---|---|---|
| Proportion of formaldehyde in total feed (moles percent) | 17.3 | 16.9 |
| Formaldehyde feed (moles/hour) | .249 | .568 |
| Mole ratio, isobutene:formaldehyde | 2.04:1 | 2.2:1 |
| Formaldehyde consumed (moles/hour) | .208 | .236 |
| Isoprene formed (moles/hour) | .053 | .0514 |
| Isoprene yield on formaldehyde consumed (moles percent) | 24.2 | 21.8 |

EXAMPLE 4

The following processes further illustrate the beneficial effect on reaction efficiency of reducing the molar proportion of formaldehyde in the feed. The processes were carried out at 300° C. at atmospheric pressure using 90 cc. of synthetic silica/alumina catalyst containing about 86% of silica. The low molar proportions of formaldehyde were obtained by vaporizing commercial formalin which had been diluted with water to suitable levels of formaldehyde concentration.

Table 5

| Run No. | 7 | 8 | 9 |
|---|---|---|---|
| Molar proportion of formaldehyde in feed (moles percent) | 8.16 | 4.66 | 2.47 |
| Formaldehyde feed (moles/hour) | 0.246 | 0.245 | 0.244 |
| Mole ratio, isobutene:formaldehyde | 3.86:1 | 4:1 | 4.1:1 |
| Formaldehyde consumed (Moles/hr.) | 0.156 | 0.103 | 0.031 |
| Isoprene formed (moles/hour) | 0.0765 | 0.062 | 0.026 |
| Isoprene yield on formaldehyde consumed (mole percent) | 49.1 | 60.2 | 83.8 |

EXAMPLE 5

A mixture of isobutene and acetaldehyde in the molar ratio of 2:1 was reacted at atmospheric pressure in the vapour phase at 300° C. over a commercial silica/alumina cracking catalyst, containing 86% of silica, which had been activated by heating in a stream of air at 600° C. for 5 hours and conditioned by contacting it with isobutene and formaldehyde at an elevated temperature for a short period. The reaction products were condensed and the conjugated diolefine produced was identified as 2-methyl-1,3-pentadiene by gas chromatographic analysis, and by hydrogenation to 2-methyl pentane as sole product.

EXAMPLE 6

A mixture of 2-methylbutene-1 and formaldehyde, fed in the form of trioxane, in the molar ratio of 2:1, was reacted at atmospheric pressure in the vapour phase at 300° C. over the catalyst described in Example 5. The reaction products were condensed and the conjugated diolefine produced was identified as 3-methyl-1,3-pentadiene by gas chromatographic analysis, and by hydrogenation to 3-methyl pentane as the main product.

EXAMPLE 7

A mixture of isobutene and formaldehyde, derived from formalin, was passed at atmospheric pressure in the vapour phase at 300° C. over a silica/zirconia cracking catalyst containing 96% of silica. The reaction products were condensed and the isoprene content determined by gas chromatography.

Two processes were carried out at different space velocities. The reaction conditions and results are shown in Table 6.

Table 6

| Run | A | B |
|---|---|---|
| Isobutene: formaldehyde molar ratio | 3.5 | 3.4 |
| Space velocity, moles total feed/litre catalyst/hour | 70 | 141 |
| Conversion of formaldehyde, percent | 83 | 62 |
| Rate of isoprene formation, grams/litre catalyst/hour | 85 | 136 |
| Yield of isoprene based on formaldehyde consumed | 26 | 27 |
| Proportion of methylbutenes in $C_5$ fraction of product | 2.7 | 1.1 |

EXAMPLE 8

A series of processes was carried out on silica/alumina cracking catalysts, made by impregnating silica gel with alumina, and having varying pore sizes and alumina contents. In each case a mixture of formaldehyde and steam, made by vaporizing 17.5 wt. percent formalin, and isobutene was passed at atmospheric pressure over the catalyst at 300° C. The reaction products during the fourth hour of reaction were condensed and the isoprene content determined by gas chromatographic analysis.

The reaction conditions and results are shown in Table 7.

Table 7

| Run No. | 1 | 2 | 3 | 4 | 5 | 6 | 7 |
|---|---|---|---|---|---|---|---|
| Catalyst (percent $Al_2O_3$) | 1 | 3 | 0.5 | 5 | 10 | 5 | 9 |
| Catalyst, average pore size of silica gel carrier, A | 22 | 22 | 83 | 83 | 83 | 140 | 140 |
| Space velocity (moles/litre of catalyst/hour) | 70 | 77 | 71 | 70 | 77 | 75 | 68 |
| Isobutene: formaldehyde molar ratio | 4.1 | 3.9 | 3.8 | 4.3 | 3.6 | 3.9 | 3.9 |
| Formaldehyde conversion (percent) | 26 | 25 | 26 | 73 | 59 | 30 | 36 |
| Isoprene formation rate (grams/litre catalyst/hr.) | 38 | 43 | 58 | 114 | 105 | 65 | 60 |
| Proportion of methylbutenes in $C_5$ fraction of total product of first four hours (percent) | 5.6 | 6.0 | 1.1 | 11.3 | 12.4 | 2.1 | 1.7 |
| Yield of isoprene based on formaldehyde consumed (percent) | 37 | 40 | 57 | 42 | 41 | 52 | 40 |

The results shown in Table 7 illustrate the variation in product purity obtained with the different catalyst, the medium pore size (with 0.5% alumina content) and the large pore size catalysts giving isoprene products with very low proportions of the undesirable methylbutenes. The efficiency of isoprene production did not vary so markedly with the different catalysts.

EXAMPLE 9

A silica/magnesia catalyst was made by impregnating silica gel so as to produce a final product containing 5% by weight magnesia. Isobutene and formaldehyde were passed over the catalyst at atmospheric pressure and at 300° C., at a rate of total feed of 70 moles per litre of catalyst per hour, and at a mole ratio of isobutene to formaldehyde of 3.6. The reaction products were condensed and analysed, showing a formaldehyde conversion of 65%, an isoprene formation rate of 64 grams per litre per hour, and an efficiency of isoprene formation of 25% of theory.

By way of comparison with this example a commercial silica/magnesia cracking catalyst containing 30% of magnesia under the same conditions gave a formaldehyde conversion of 100% and an efficiency of isoprene formation of only 4%.

I claim:
1. A process for the production of isoprene which comprises reacting isobutent with formaldehyde at an elevated temperature in the range of 150° to 400° C. in the vapor phase in the presence of a catalyst which consists essentially of silica/alumina synthetic petroleum cracking catalyst.
2. A process for the production of isoprene which comprises reacting isobutene with formaldehyde at an elevated temperature in the range of 150° to 400° C. in the vapor phase in the presence of a catalyst which consists essentially of silica/alumina synthetic petroleum cracking catalyst containing at least about 85% by weight of silica.
3. A process for the production of isoprene which comprises reacting isobutene with formaldehyde at an elevated temperature in the range of 150° to 400° C. in the vapor phase in the presence of a catalyst which consists essentially of silica/alumina synthetic petroleum cracking catalyst and wherein the silica has an average pore diameter exceeding 30 A.

References Cited in the file of this patent

UNITED STATES PATENTS

| 2,368,494 | Rosen et al. | Jan. 30, 1945 |
| 2,376,986 | Shoemaker | May 29, 1945 |
| 2,377,025 | Miller | May 29, 1945 |
| 2,389,205 | Marsh | Nov. 20, 1945 |
| 2,412,762 | Workman | Dec. 17, 1946 |
| 2,694,673 | Kimberlin et al. | Nov. 16, 1954 |